United States Patent [19]
Armstrong

[11] Patent Number: 5,631,537
[45] Date of Patent: May 20, 1997

[54] BATTERY CHARGE MANAGEMENT/ PROTECTION APPARATUS

[75] Inventor: Gene Armstrong, Plano, Tex.

[73] Assignee: Benchmarq Microelectronics, Dallas, Tex.

[21] Appl. No.: 544,201

[22] Filed: Oct. 17, 1995

[51] Int. Cl.[6] .................................................. H02J 7/00
[52] U.S. Cl. ................................ 320/15; 320/39; 324/427
[58] Field of Search ................................ 320/14, 15, 16, 320/17, 30, 32, 39; 361/12, 16, 67; 324/426, 427, 428

[56] References Cited

U.S. PATENT DOCUMENTS

| | | | |
|---|---|---|---|
| 4,238,721 | 12/1980 | DeLuca et al. | 320/18 |
| 4,616,170 | 10/1986 | Urstoger | 320/5 |
| 5,153,496 | 10/1992 | LaForge | 320/17 |
| 5,206,578 | 4/1993 | Nor | 320/14 |

Primary Examiner—Peter S. Wong
Assistant Examiner—Gregory J. Toatley, Jr.
Attorney, Agent, or Firm—Gregory M. Howison

[57] ABSTRACT

A battery charger/protection device (10) is provided for charging a battery pack (12) comprised of four lithium ion cells. Each of the cells is selectively monitored by examining the voltage thereacross. An overvoltage condition is checked for a cell, an undervoltage condition for a cell is checked and an overcurrent condition for the entire battery pack (12) is checked. This is achieved by comparing the voltage with predetermined threshold voltages during the charging operation. This is a sequential operation wherein each of the batteries is sequentially examined in a continuous manner through the charging operation in accordance with a predetermined scheme. Switches (30) and (28) are provided for terminating a charging operation during charging. During operation, the undervoltage condition can be checked and the charger/protection device (10) placed in a sleep mode. The charger/protection device (10) provides a finite number of terminals for accessing any combination of cells. By connecting the terminals together for an unused cell, information about the cell across those two terminals can be nullified by indicating that no cell is present and that a short has been substituted for the cell, information about this cell then not utilized in the charging monitoring operation. This allows a single part to accommodate different batteries.

23 Claims, 8 Drawing Sheets

BATTERY CHARGE MANAGEMENT/ PROTECTION APPARATUS

TECHNICAL FIELD OF THE INVENTION

The present invention pertains in general to battery chargers and, more particularly, to a charger for charging multiple batteries disposed in series of the lithium ion type.

BACKGROUND OF THE INVENTION

Battery chargers typically view a battery as a two terminal device, a positive terminal and a negative terminal. During charging, typical chargers will monitor the voltage across the two terminals and the current entering the battery and the voltage profiles of the battery during charging. For example, one decision made during charging of a NiCd battery is to look for a slight "dip" in the battery voltage. This indicates a fully charged battery.

Lithium ion batteries present a different problem in that these batteries, similar to NiCd batteries, are disposed in series. However, it is very important to ensure that there is no overcharging or overdischarging of a particular cell. A given cell can be overcharged or undercharged and be destroyed. Destruction of a single cell will render an entire battery pack unusable. Therefore, charging systems must be made based upon a given cell and not on the entire group of cells as a battery pack.

SUMMARY OF THE INVENTION

The present invention disclosed and claimed herein comprises a battery charger/monitor for charging/monitoring a plurality of series-connected battery cells in a battery pack which can be charged from an external charging supply. A package is provided for the battery charger/monitor having a finite set of input/output pins, the input/output pins including a plurality of input sense pins arranged in pairs. Each pair of sense pins is able to be connected across a battery cell in a battery pack, wherein each of the cells in the battery pack is associated with a separate one of the pairs of sense pins. A voltage monitor is provided to monitor the voltage across each of the pairs of sense pins. A test circuit then performs a plurality of tests on each pair of sense pins utilizing the associated monitored voltage provided by the voltage monitor. Each of the tests determines characteristics of the battery pack by monitoring the voltage on the sense pins and applying a predetermined test algorithm thereto that compares the determined characteristics with predetermined acceptable limits to determine if the monitor characteristics are outside of the acceptable limits. A no cell is provided to determine if any of the pairs of sense pins has no cell connected thereacross as determined by the monitor voltage output by the monitoring circuit. A control system then controls the charging operation of the battery in accordance with the results determined by the test circuit. However, an inhibiting circuit inhibits the results of the tests that are being utilized by the control system that result from the ones of the sense pins determined by the null circuit not to have a cell associated therewith.

Another aspect of the present invention, the pairs of sense pins are adjacent to each other and each adjacent pair of sense pins sharing a common sense pin. If the number of pairs of sense pins is greater than the number of cells in the battery pack, then a conductor short will be disposed across the pins not having a cell associated therewith. When the first test that is performed whenever any pair of sense pins is selected to have the voltage monitored by the voltage monitor, the voltage monitor compares the voltage on that pair of sense pins with a predetermined voltage threshold and, if the monitored voltage falls below the predetermined voltage, an indication that a short is disposed across the sense pins is indicated. This indicates that no cells are monitored thereacross.

In a further aspect of the present invention, the test circuit comprises a comparator having a cell monitor voltage input, a reference voltage input and an output. A multiplexer is provided having multiple inputs and a single output. The single output is connected to the monitored voltage input of the comparator and the multiple inputs are connected across each of the pairs of sense pins. The multiplexer is operable to selectively measure the voltage across each of the pairs of sense pins in a predetermined order and provided on the output thereof. A programmable attenuator provides multiple voltage references, each reference voltage associated with one of the plurality of tests. A test control system then controls the multiplexer and the programmable attenuator to perform the plurality of tests in a first predetermined order on the pairs of sense pins in a second predetermined order, such that each of the sense pins is first selected and then each of the plurality of tests is performed by the test circuit on the selected pair of sense pins.

In a yet further aspect of the present invention, the programmable attenuator includes a low reference voltage for use with the no cell circuit and the no cell circuit comprises the programmable attenuator utilizing the low reference voltage. The system is operable to utilize the low reference voltage upon selection of each of the pairs of sense pins by the multiplexer prior to performing any of the tests. The control system comprises a switching device for being connected between one side of the battery pack opposite to the side connected to the positive terminal of the charging supply and the other side thereof connected to the negative side of the charging supply. The switching device has a finite impedance associated therewith, and is controlled by the control system to interrupt charging in a predetermined manner, this being a switchable impedance device. At least two of the tests comprise a comparison of the monitored voltage across each of the pairs of sense pins with an upper voltage threshold and, if it exceeds the upper voltage threshold, an overvoltage condition is declared. Upon declaration of the overvoltage condition, the switching device is open such that current does not pass into the battery pack. In the other of the tests, the monitored voltage on each of the pairs of sense pins is compared to a mid-level threshold voltage and a charge enable condition is declared when the monitored voltage on a given set of the pairs of sense pins falls below the mid-level threshold voltage. The control system is then operable to terminate charge upon declaration of an overvoltage condition by opening the switching device and enabling charge upon the declaration of the charge enable condition by closing the switch.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
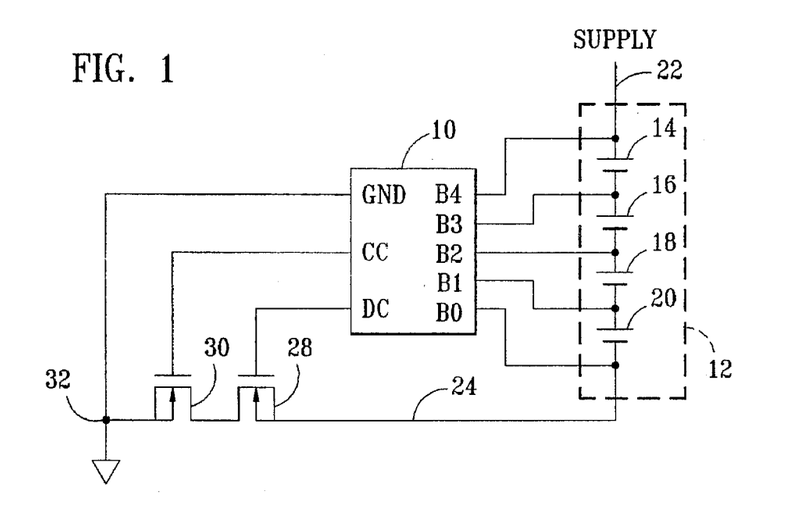
FIG. 1 illustrates the battery charger/protective device and the connection thereof to four series connected lithium ion batteries in a battery pack.

Referring now to FIG. 1, there is illustrated a block diagram of a battery charger 10 operating in accordance with the present invention which is connected to a battery pack 12. The battery pack 12 is comprised of four series connected lithium ion batteries, 14, 16, 18 and 20 connected in that order with the positive terminal of battery 14 connected to a supply terminal 22 and the negative terminal of battery 20 connected to the negative terminal of battery 24. The positive terminal of battery 14 is connected to the B4 input of the charger/protection device 10, the positive terminal of battery 16 and the negative terminal the battery 14 connected together and to the terminal B3 of the charger/ protection device 10, the positive terminal of battery 18 and the negative terminal of battery 16 connected to the B2 output of the charger/protection device 10, the negative terminal of battery 18 and the positive terminal of battery 20 connected together and to the B1 terminal of charger 10. The negative terminal of battery 20, also the negative terminal 24 of the battery pack, is connected to the B0 output of the charger/protection device 10.

The negative terminal 24 of the battery pack is connected to one side of an N-channel transistor 28, the other side thereof connected to one side of an N-channel transistor 30. The other side of the transistor 30 is connected to a ground terminal 32, ground terminal 32 also connected to the GND input to the charger/protection device 10. The gate of transistor 28 is connected to the DC output of the charger/ protection device 10 and the gate of transistor 30 is connected to the CC output of transistor 10. The DC terminal is associated with a discharge operation and the CC terminal is associated with a charging operation.

Figure 2:
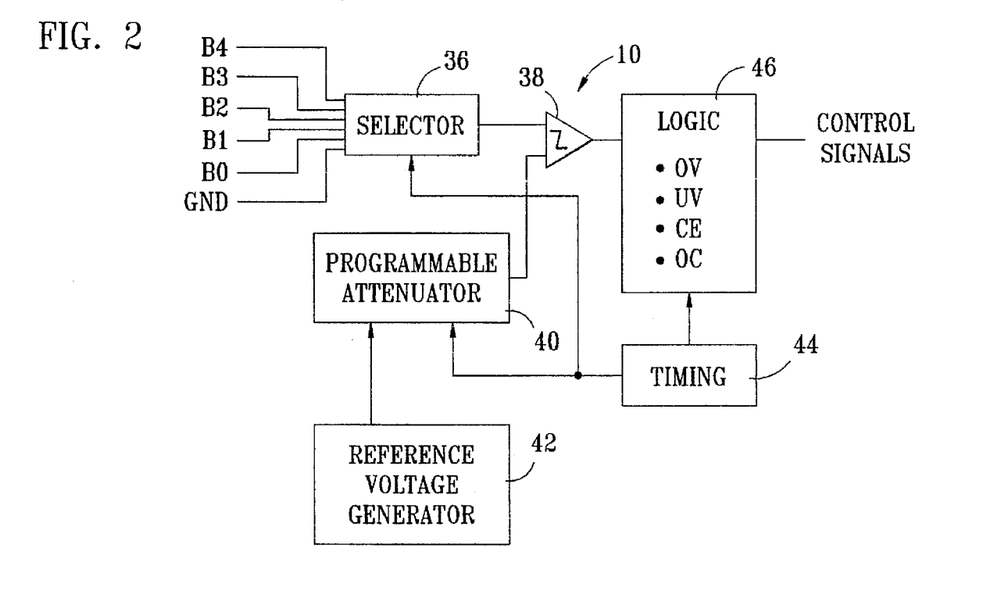
FIG. 2 illustrates a block diagram of the battery charger/ protective device.

Referring now to FIG. 2, there is illustrated a block diagram of the charger/protection device 10. The battery input terminals B0–B4 are input to five inputs of a selector 36. The selector 36 is operable to select any combination of B0–B4, such that an individual cell can have the voltage thereacross examined. Additionally, the voltage at any terminal can be examined, ground also being one input. The voltage on the input B4, representing the supply terminal 22 to the battery pack, constitutes the overall power supply voltage to the system. The output of the selector 36 is input to one input of a comparator 38, the reference input thereof connected to the output of a programmable attenuator 40. The programmable attenuator 40 has as one input the output of a reference voltage generator 42. The reference voltage generator 42 is a band gap voltage reference generator, these being conventional in the industry. However, the reference voltage generator 42 operates under a wide range of supply voltages, the primary voltage to the reference voltage generator 42 being the B4 terminal voltage. As will be described hereinbelow, the battery pack 12 can be comprised of less than four cells. In the event that less than four cells are provided, the top cell terminals are connected together. For example, if there were only two cells 18 and 20, then B2, B3 and B4 would be connected together and to terminal 22.

Additionally, the timing circuit 44 is provided for generating timing information which is utilized by both the programmable attenuator 40 and the selector 36. As will be described hereinbelow, the selector 36 is a sequential circuit. The output of comparator 38 is input to a logic circuit 46, which logic circuit 46 is operable to determine whether an over-voltage condition exists, and under-voltage condition exists, a charge enable condition exists or an over-current condition exists. Further, a determination can be made as to whether there is a given cell across two terminals or there is a short across the two terminals. The logic circuit 46 provides the control signals that are utilized to control the overall system and also to control the two transistors 28 and 30.

Figure 3:
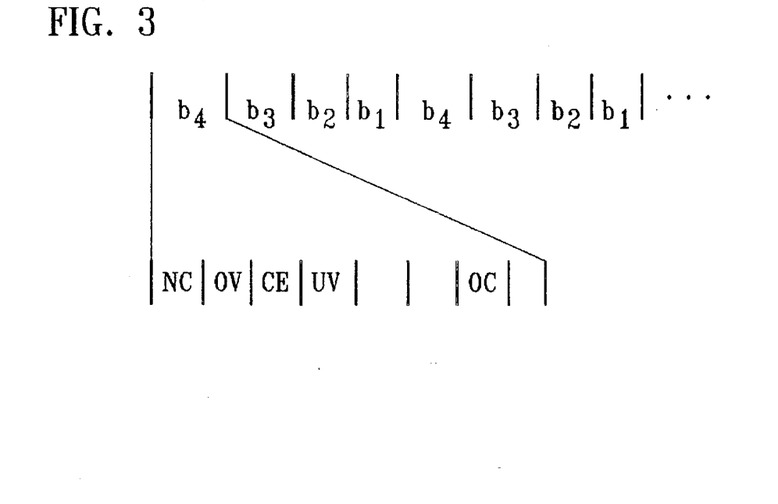
FIG. 3 illustrates a diagrammatic view of the sequencing operation of the battery charger/protective device of the present invention.

Referring now to FIG. 3, there is illustrated a diagrammatic view of the sequential operation. The sequencer operates to examine each of the cells 14–20 individually, these being cells $B_1$, $B_2$, $B_3$, and $B_4$. This is achieved by examining the terminals B0, B1, B2, B3 and B4. This is done in a continuous manner on a periodic basis such that $B_3$ is first examined, followed by $B_4$, followed by $B_1$, followed by $B_2$ and so on.

During each examination cycle of a given one of the cells 14–20, a number of tests are sequenced through. There are eight time slots, five of which are illustrated in FIG. 3. The first test that is performed is to determine if there is a cell available. This is achieved by examining the voltage across the terminals utilizing the comparator 38 to determine if the voltage is greater than 250 mV. If it is less than 250 mV, then a determination is made that there is no cell (NC) and this constitutes a short. Under this condition, the rest of the tests for this cell will be ignored, as will be described hereinbelow. The next test to perform is the overvoltage test. The voltage is measured and compared with a threshold voltage of 4.25 volts. If it is greater than or equal to 4.25 volts, this constitutes an overvoltage. The next test is the charge enable test which is a determination made by comparing the voltage across the cell to a threshold voltage of 4.15 volts. If it is less than or equal to this voltage, then a charge enable condition exists. The next test is an undervoltage test which makes a determination as to whether the cell is less than or equal to a value of 2.3 volts. It is important to understand that these voltages are programmable and they can be changed by the customer. This merely requires some trim variations made in the integrated circuit during processing and final test.

The last test to be made is the overcurrent (OC) test. This is a test that is performed on the series current through the battery. As will be described hereinbelow, this test is facilitated by measuring the voltage across the channels of the series connected transistors 28 and 30. By examining the voltage across these transistors 28 and 30, a course measurement of the current therethrough can be made. If it goes above a certain level, this constitutes an overcurrent situation.

Figure 4:
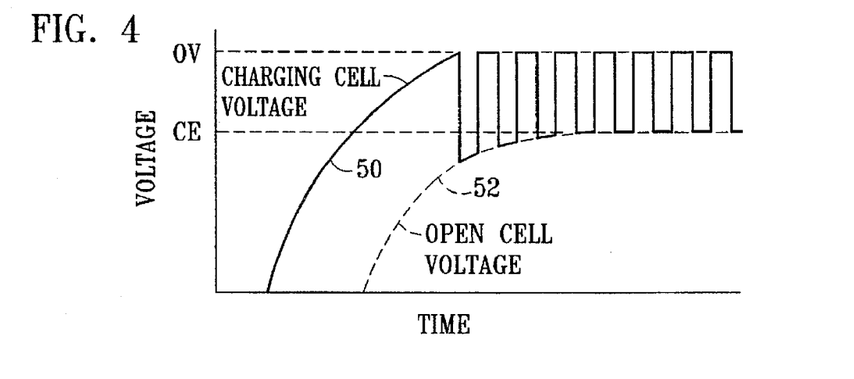
FIG. 4 illustrates a voltage versus time plot during the charging operation.

Referring now to FIG. 4, there is illustrated a plot of voltage versus time. When the charging operation is initiated, the charge supply is applied to the battery pack 12 and the cells will undergo an increase in voltage, this being illustrated by a solid line 50. When the cell voltage reaches the overvoltage level (OV), the CC output is connected to GND, disabling charge into the battery pack 12. This condition is maintained until all the cell voltages fall below the charge enable (CE) level. A dotted line 52 is provided for the open cell voltage, which is the voltage that will exist across the battery without a charging supply attached, i.e., the battery voltage collapses to this voltage when current is not being input thereto. However, since this is a sequential operation, it can be seen that the voltage of a given cell will fall below CE and will not be mined on again until it is reset by the control system. At this time, the battery voltage will again increase up to the OV level and, once reaching that, it will be turned off on the next cycle, i.e., the next time that battery cell is examined. Therefore, the operation is to determine if any battery exceeds the overvoltage condition and then terminate charging. However, in order to reinitiate charging, all cells must have an open cell voltage level that falls below the charge enable (CE) level. This prevents excessive charging. As the open cell voltage converges to the CE voltage level, the amount of time that the transistor 30 will again be turned on is reduced relative to the time it is turned off.

Figure 5:
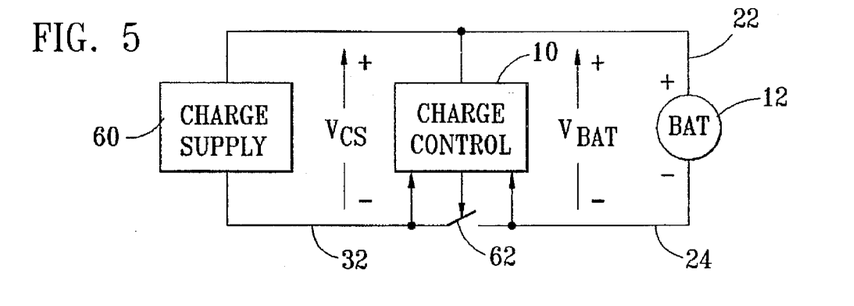
FIG. 5 illustrates a block diagram of the charge control circuit of the present invention for the operation of determining the direction of current to initiate a charging operation.

Referring now to FIG. 5, there is illustrated a block diagram of the charger/protection device 10 connected in a charging operation. In this mode, a charging supply 60 is connected between the terminal 22 and the terminal 32, terminal 32 being ground and, terminal 22 being the positive battery terminal and also the power supply for the charger/ protection device 10. As will be described hereinbelow with respect to the flowchart of FIG. 5a, this system is operable to determine the existence of a charging supply.

Figure 5A:
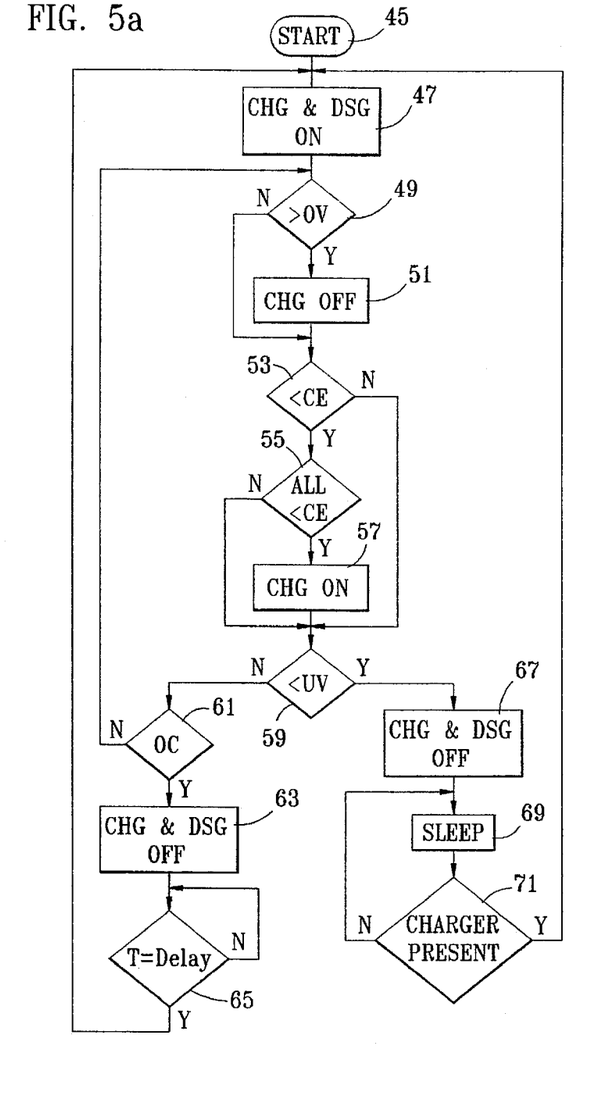
FIG. 5a illustrates a flowchart for determination of the charging operation.

Referring now to FIG. 5a, there is illustrated a flowchart depicting the operation of the switch 62. As described above, the switch 62 is comprised of the transistors 28 and 30. These are controlled with CHG and DSG signals, respectively. The program is initiated at a Start block 25 and then proceeds to a function block 47 to turn the CHG and DSG signals on. The program then flows to a decision block 49 to determine if the voltage of the tested cell is greater than the overvoltage threshold. If so, the program flows along a "Y" path to a function block 51 to determine the CHG signal off. If not, the program flows along an "N" path from decision block 49 around the function block 51. Both paths will flow to a decision block 53. Decision block 53 determines whether the cell voltage is less than the charge enable voltage. If so, the program flows to a decision block 55 to determine if all of the cells have been determined to have a voltage that is less than the charge enable voltage. If not, the program will flow along an "N" path to the input of a decision block 59. Additionally, if the voltage on the cell had been determined not to be less than the charge enable threshold, the program would flow from decision block 53 along an "N" path to the input of decision block 59. If the decision block 55 had determined that all of the cell voltages were less than the charge enable voltage, this would indicate that charging was again to resume. This is represented by a function block 57. After charging has been resumed, the program would again flow to the decision block 59.

Decision block 59 determines whether the voltage of the tested cell is less than the undervoltage threshold voltage. If not, the program would flow along the "N" path to decision block 61 to determine if an overcurrent condition exists. If the overcurrent condition does not exist, the program will flow along an "N" path back to the input of decision block 49 and another cell will be tested. If, however, an overcurrent condition had existed, the program would flow from decision block 61 along a "Y" path to the input of a function block 63 to turn the CHG and DSG signals off. The program would then flow to a decision block 65 to determine if a predetermined amount of delay has occurred. Until this predetermined amount of delay has occurred, the program will flow back to the input of decision block 65 along an "N" path. Once the delay has occurred, the program will flow along a "Y" path back to the input of function block 47 to again turn the CHG and DSG signals on. If an overcurrent condition has not gone away, the program will quickly flow back to the input of decision block 61 and again turn the CHG and DSG signals off at function block 63. In operation, the way this is performed is that each time the cell $B_2$ is tested, the "Y" path from decision block 65 back to decision block 47 is traversed. Therefore, all tests will be cycled through for the number of cells associated with the system, this processing time for a complete cycle constituting the delay.

If an undervoltage condition were determined at decision block 59, the program would flow along the "Y" path to a function block 67 to turn the CHG and DSG signals off and then flow to a function block 69 to place the system in a sleep condition. The program would then flow to a decision block 71 to determine if the charger were present. If not, the program would flow back to the input of function block 69. If a charger were present, as determined by the voltage on terminal 24 rising above the voltage on terminal 32 by a predetermined voltage of 30 mV, the program would flow along the "Y" path back to the input of function block 47 to again turn the CHG and DSG signals on.

Figure 5B:
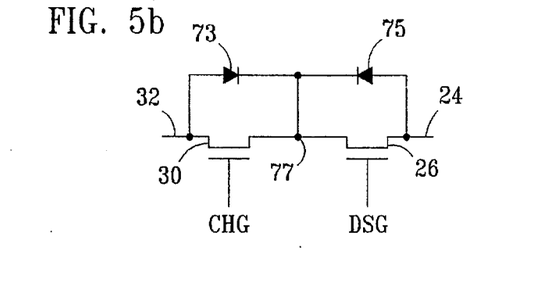
FIG. 5b illustrates a detailed schematic of the CHG and DSG transistors.

Referring now to FIG. 5b, there is illustrated a more detailed diagram of the transistors 28 and 30. The transistors 28 and 30 have an intrinsic diode associated with the substrate that has the cathode thereof disposed at the source. The transistors are connected in such a manner that the source of transistor 30 is connected to terminal 32 and the source of transistor 28 is connected to the terminal 24. This results in an internal diode 73 associated with the transistor 30 having the cathode thereof connected to a node 77 at the junction between the source/drain paths of the transistors 28 and 30. Similarly, the anode of a diode 75 is connected to the node 77. The purpose for this orientation is that, whenever the CHG signal is turned off and transistor 30 is placed in a nonconductive state, the diode 73 will conduct whenever current flows from terminal 30 to terminal 24. This is the condition for a discharge operation. Therefore, for example, whenever the overvoltage condition is determined in decision block 49, the CHG signal will be turned off. However, if a discharge operation is not allowed, then any load across the battery will not have current supplied from the battery to the load. Therefore, the orientation of the transistors provides for this. Of course, the DSG signal will also be deactivated in the event of an overcurrent condition or an undervoltage condition. Typically, the undervoltage condition only occurs during a discharge operation and the overcurrent condition typically occurs only during a charging operation.

Figure 6:
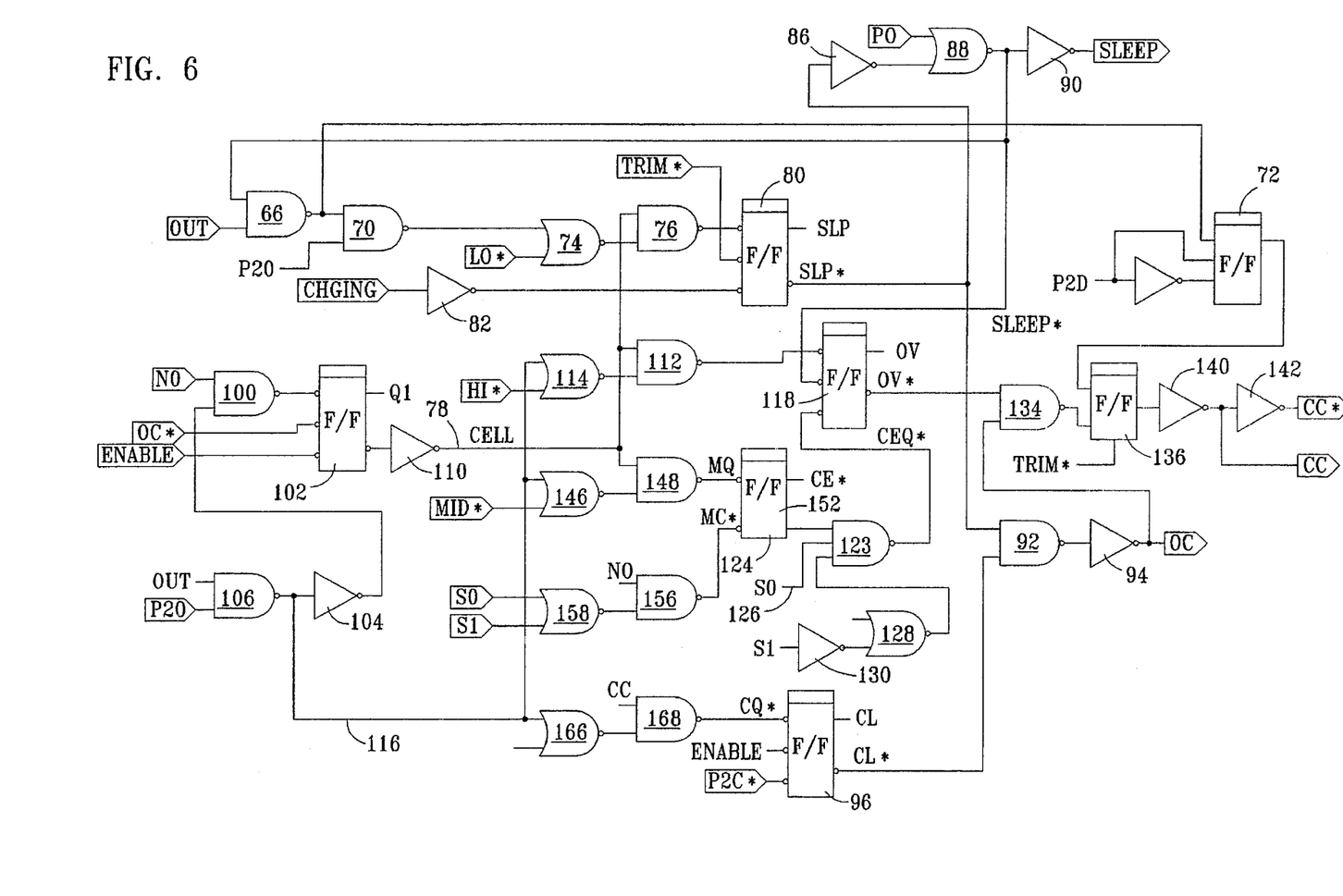
FIG. 6 illustrates a logic diagram for the portion of the control circuit of the present invention.

Referring now to FIG. 6, there is illustrated a logic diagram for the control circuitry utilized to generate the control signals that operate the gates of transistors 28 and 30. Additionally, other control signals are generated. A comparator output signal from the comparator 38 labeled OUT is input to one input of a NAND 66, the other input connected to a signal SLEEP*. The output of NAND gate 66 is input to one input of a NAND gate 70 and also to the data input of a flip flop 72. The other input of NAND gate 70 is connected a timing signal P2D. The output of NAND gate 70 is input to one input of a NOR gate 74, the other input thereof connected to the LO* signal which is the undervoltage signal UV-Bar. The output of NOR gate 74 is input to one input of a NAND gate 76, the other input thereof connected to a voltage signal CELL on a node 78. The output of NAND gate 76 is input to the set input of a flip flop 80. Flip flop 80 has the reset input thereof connected to a TRIM* signal, which is basically a hardware trim signal that is provided by circuit (not shown) that allows voltages to be trimmed during manufacturing. An additional reset input is connected to the output of an invertor 82, the input thereof connected to a signal CHGING, this generated by a comparator (shown herein below) that is operable to determine if a charge supply 60 is connected, this described above with respect to FIG. 5. The output of the flip flop 80 provides the sleep signals SLP and SLP*.

The SLP* signal is input to a sleep circuit, which consists of an invertor 86 having the output thereof connected to one input of a NOR gate 88, and the other input of the NOR gate 88 connected to a timing signal PD, which is output from a test circuit. This typically is not utilized during operation of the charging. The output of the NOR gate 88 is connected through an invertor 90 to provide the signal SLEEP which places the circuit in a sleep mode. The SLP* signal is also input to one input of a NAND gate 92, the output thereof connected to the input of an invertor 94, the output thereof providing the DC signal for controlling one of the transistors 28 and 30. The other input of NAND gate 92 is connected to a CL* signal output by the Q-Bar output of a flip flop 96.

The NO cell signal, indicating the operation wherein the no cell condition is tested is input to one input of a NAND gate 100, the output thereof connected to the set input of a flip flop 102. The other input of the NAND gate 100 is connected to the output of an invertor 104, labeled DQ, the input of invertor 104 connected to the output of a NAND gate 106, one input of NAND gate 106 connected to the OUT signal from the comparator 38 and the other input connected to a timing signal P2D. The flip flop 102 has one reset input thereof connected to the OC* signal, this representing the inverse of the overcurrent signal and the other reset input connected to a signal ENABLE. This is a signal that is generated by the timing circuitry. The Q-Bar output of flip flop 102 is connected through an invertor 110 to provide the CELL signal on node 78. This signal, in addition to being input to the other input of NAND gate 76, is also input to one input of a NAND gate 112, the other input connected to the output of a NOR gate 114. NOR gate 114 has one input thereof connected to the timing signal HI*, this being the inverse overvoltage signal OV-Bar, and the other input thereof connected to the DQ* signal output by NAND gate 106 on a node 116. The output of NAND gate 112 is labeled HQ* and is input to the set input of a flip flop 118, the output thereof providing the OV* signal, representing the overvoltage-Bar signal. The two reset inputs are connected to the SLEEP* signal and also to a CEQ* signal output by a NAND gate 122. NAND gate 122 is a three-input NAND-gate, one input thereof connected to a charge enable signal (CE) output by a flip flop 124, one input connected to a multiplex signal SO on a node 126, and the third input thereof connected to the output of a NOR gate 128. NOR gate 128 has one input thereof connected to the HI* signal, representing the timing signal associated with the overvoltage test and the other input thereof connected to the output of an invertor 130, the input thereof connected to the timing signal S1. As will be described hereinbelow, the signal S0 and S1 are associated with the particular battery cell that is tested, this output by the multiplexer.

The OV* signal output by flip flop 118 is connected to one input of a NAND gate 134, the output thereof connected to one input of a multiplexer 136, the other input of multiplexer 136 connected to the Q-output of flip flop 72. The other input of NAND gate 134 is connected to the DC output of a NOR gate 94, this being the discharge output to control one of the transistors 28 or 30. The output of multiplexer 136 is connected to the input of an invertor 140, the output thereof providing a CC output, this connected through an invertor 142 to provide the CC* output.

The MID* timing signal, representing the charge enable (CE) operation, is input to one input of a NOR gate 146, the output thereof connected to one input of a NAND gate 148, the other input of NAND gate 148 connected to the CELL signal on node 78. The other input of NAND gate 146 is connected to the node 116 for the DQ signal. The output of NAND gate 148 is input to the set input of a flip flop 152, the reset input connected to a signal MC* output by a NAND gate 156. This is a selective reset operation that only generates an output when all of the battery voltages are below the charge enable threshold. The NAND gate 156 has two inputs, one input connected to the NO signal associated with the no cell indicator, and the other input thereof connected to the output of a NOR gate 158. NOR gate 158 has one input thereof connected to the SO signal and the other input thereof connected to the S1 signal.

The DQ* signal on node 116 is input to one input of a NOR gate 166, the other input thereof connected to the OC* signal. The output of NOR gate 166 is connected to one input of a NAND gate 168, the other input thereof connected to the CC signal that is output by invertor 140. This outputs the signal CC*, which is input to the set input of the flip flop 96. As noted above, the reset inputs are connected to the ENABLE signal and the P2C* timing signal.

The control circuit of FIG. 6 is operable to provide conditions that set the charge and discharge control outputs and reset these signals. This is a function of a time slot during which the control signal is generated and the output state of the comparator 38.

Figures 7, 8:
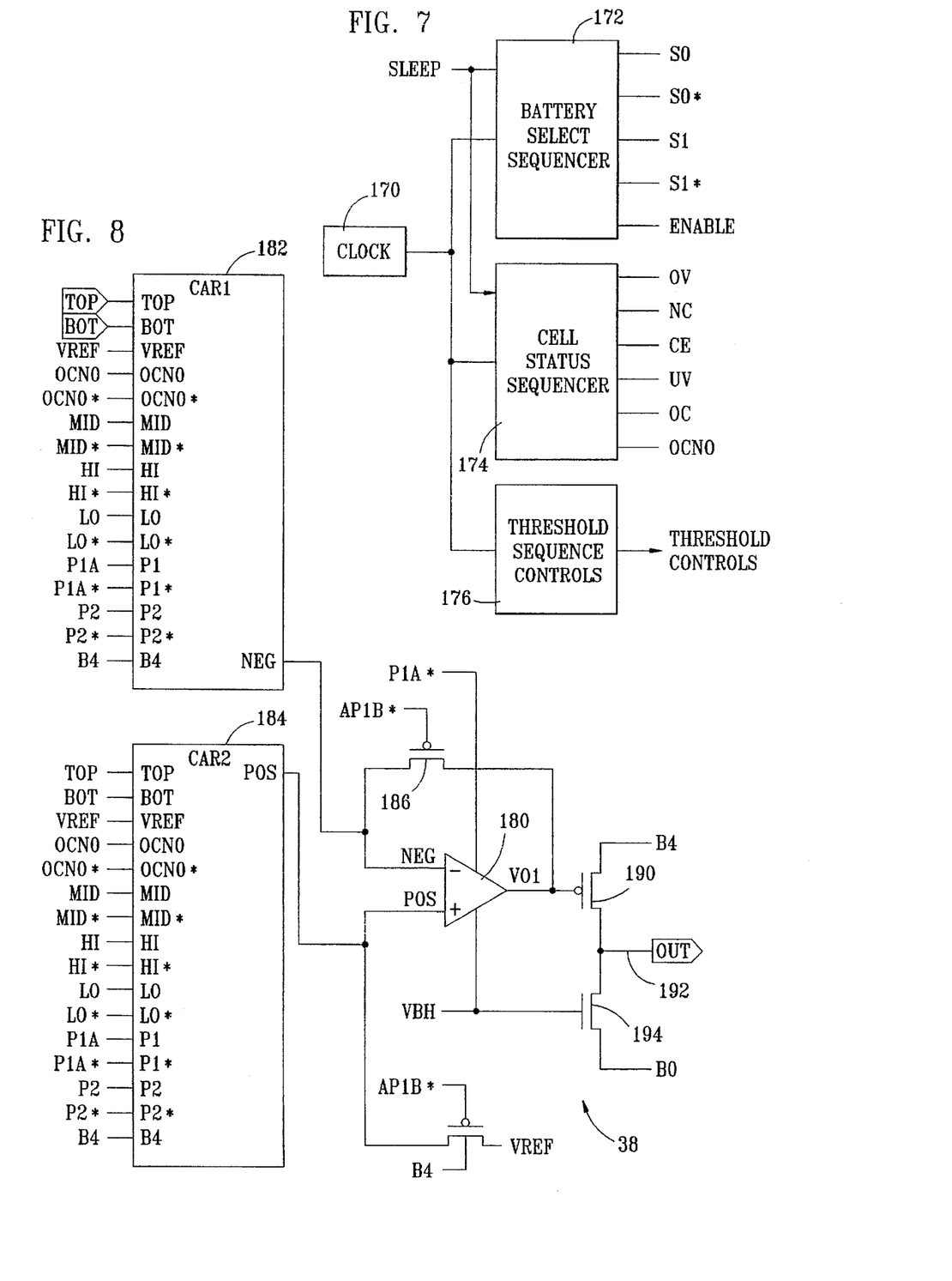
FIG. 7 illustrates a block diagram of the sequencer.
FIG. 8 illustrates a block diagram of the comparator.

Referring now to FIG. 7, there is illustrated a general block diagram of the sequencer that determines the timing signals. A general clock 170 is provided which is connected to a battery select sequencer 172, a cell status sequencer 174 and a block 176 for generating threshold sequence control signals. The battery select sequencer 172 outputs the battery select multiplex control signals in addition to an ENABLE signal. The cell status sequencer outputs the signal associated with the overvoltage control (OV), the no cell determination signal (NC), the charge enable signal (CE), the undervoltage control signal (UV) and the overcurrent control signal (OC). The signal OV is represented by an HI signal, the signal NC is represented by a NO signal, the CE signal is represented by a signal MID, and the UV signal is represented by an LO signal. The threshold sequence control 176 provides threshold control signals P1A*, P1B, P2*, P2R*, P1R and P2D. This control is basically a series of flip flops which utilizes tapped outputs and logic. In general, the sequence controls provide for sequential selection of a battery cell for testing and then, once the cell is selected, the various status conditions for that cell are tested. Thereafter, the next battery is selected and the cell status sequencer 174 again increments through the various tests that are performed. The threshold sequence control circuit 176 provides the timing for sequencing through the individual tests. A sleep signal is connected to the battery select sequencer 172 and the cell status sequencer 174 to decrease the power thereof during the sleep mode.

Referring now to FIG. 8, there is illustrated a block diagram for the comparator 38. The comparator 38 is comprised of a fully differential comparator 180, having the negative input thereof connected to a compactor array 182 and a positive input thereof to the compactor array 184. The negative input to comparator 180 is connected through a P-channel transistor 186 to the output thereof, the gate of transistor connected to a control signal AP1D*, this transistor 186 providing a feedback path for the purpose of DC offset cancellation. The comparator 180 has a bias input thereof connected to a bias voltage VBIAS and also has an input thereof connected to a P1A* signal, this being a compensation input. The output of comparator 180 drives the gate of a P-channel transistor 190, one side thereof connected to the B4 voltage level and the other side thereof providing the control output signal OUT on a node 192. Node 192 is connected to the B0 terminal through an N-channel transistor 194, the gate thereof connected to the bias VBIAS.

Figure 9:
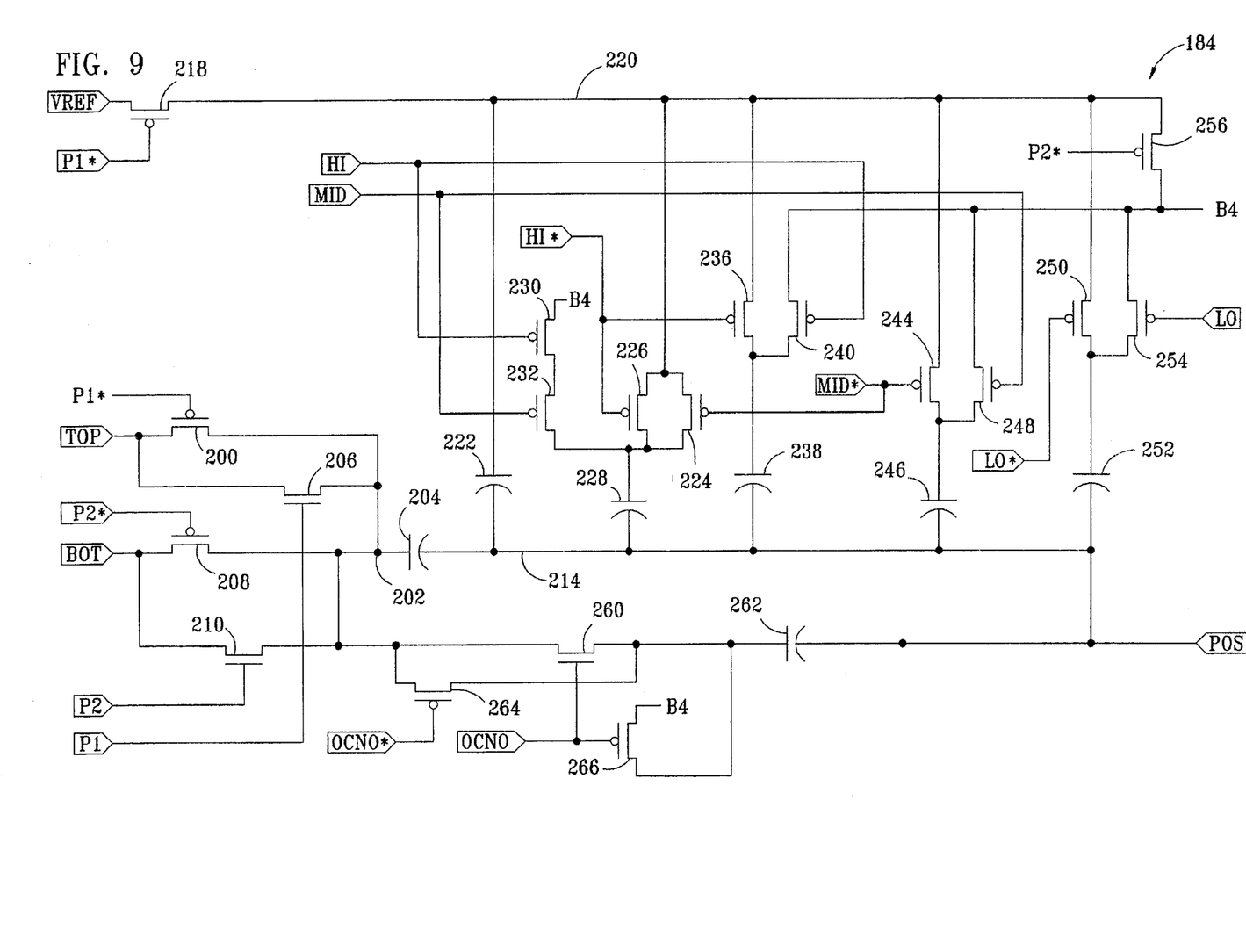
FIG. 9 illustrates the comparator compactor array.

Referring now to FIG. 9, there is illustrated a schematic diagram of the comparator array 184. The comparator array 184 receives two signals from a multiplexer circuit, TOP and BOT, representing the top and bottom of the cell that is being examined. The TOP signal is input through a P-channel transistor 200 to a node 202 which is connected to one plate of a capacitor 204. The transistor 200 is controlled by a timing signal P1*. Additionally, the TOP signal is connected to the node 202 through an N-channel transistor 206, the gate thereof connected to the timing signal P1. Therefore, transistor 200 and 206 provide a gate. Similarly, the BOT signal is connected through a P-channel transistor 208 and an N-channel transistor 210 connected in a gate configuration with the gate of transistor 210 connected to the P2 signal and the gate of transistor 208 connected to the P2* signal. The other plate of capacitor 204 is connected to a node 214, this comprising the POS output which is connected to the positive input of the differential comparator 180. The reference voltage generator 42 output VREF is connected to one side of a P-channel transistor 218, the other side thereof connected to a node 220, the gate of transistor 218 connected to the P1* timing signal. Node 220 is connected to one side of the capacitor 222, the other side thereof connected to node 214. Node 220 is also connected to one side of two parallel connected P-channel transistors 224 and 226, the other sides of transistors 224 and 226 connected to one side of a capacitor 228, the other side thereof connected to the node 214. The gate of transistor 226 is connected to the HI* signal associated with the overvoltage indicator, with the gate of transistor 224 connected to the MID* signal, associated with the charge enable status. The B4 voltage level is connected through two series connected P-channel transistors 230 and 232, the gate of transistor 230 connected to the HI input signal and the gate of transistor 232 connected to the MID input signal. The other side of the two series connected transistors 230 and 232 are connected to the one plate of a capacitor 228 associated with transistors 224 and 226.

A P-channel transistor 236 is connected between node 220 and one plate of a capacitor 238, the other plate of capacitor 238 connected to node 214. The gate of transistor 236 is connected to the HI* signal. A P-channel transistor 240 is connected between the B4 terminal and the one plate of capacitor 238, the gate of transistor 240 connected to the HI signal. A P-channel transistor 244 is connected between the node 220 and one plate of a capacitor 246, the gate of transistor 244 connected to the MID* signal. A P-channel transistor 248 is connected between the B4 terminal and one plate of capacitor 246, the gate of transistor 248 connected to the MID signal. A P-channel transistor 250 is connected between the node 220 and one plate of a capacitor 252, the other plate of capacitor 252 connected to the node 214. The gate of transistor 250 is connected to the LO* signal. A P-channel transistor 254 is connected between the B4 terminal and the one plate of a capacitor 252, the gate of transistor 254 connected to the LO signal. A P-channel transistor 256 is provided which is connected between the B4 terminal, this being the highest voltage in the system and the terminal 220. The gate of transistor 256 is connected to the P2* timing signal. The only difference between the capacitor array 184 and the capacitor array 182 is that the gate of the corresponding transistor 256 is controlled by a different timing signal, the P1* signal and the gate of transistor 218 in capacitor 184 is controlled by the signal P1* and the gate of the corresponding transistor 218 in the comparator capacitor array 182 as controlled by the timing signal P2*. Therefore, the transistor 218 initially connects the node 220 to $V_{ref}$ such that the plate of capacitor 220 is disposed at the REF on the selective one of the capacitors 228, 238, 246 and 252 is also connected to the VREF voltage level. The VREF in the comparator 184 is connected to node 220, the TOP signal is connected to node 202. This develops the voltage on the node 214 that is the function of the capacitor values. In the capacitor array 182, the inverse is true; that is, when the VREF is applied to node 222 in the presence of the P2* signal, the voltage on the BOT terminal output from the multiplexer is input on the node 202.

A signal OCNO* and OCNO are generated by the sequencer control, this representing the NOR function of the time slot or test period for either the open circuit test condition or the no cell test condition. The node 202 is connected through an N-channel transistor 260 to one plate of a capacitor 262, the other plate thereof connected to the node 214. A P-channel transistor 264 is connected in parallel with transistor 260, the gate thereof connected to the OCNO* signal. The OCNO signal is also connected to the gate of a P-channel transistor 266, which has the channel thereof connected between the voltage on B4 and the one plate of the capacitor 262. In this condition, the capacitor 262 is merely placed in parallel with the capacitor 204. As described above, the circuitry for the capacitor array 182 is identical to that of the capacitor array 184.

Figure 10:
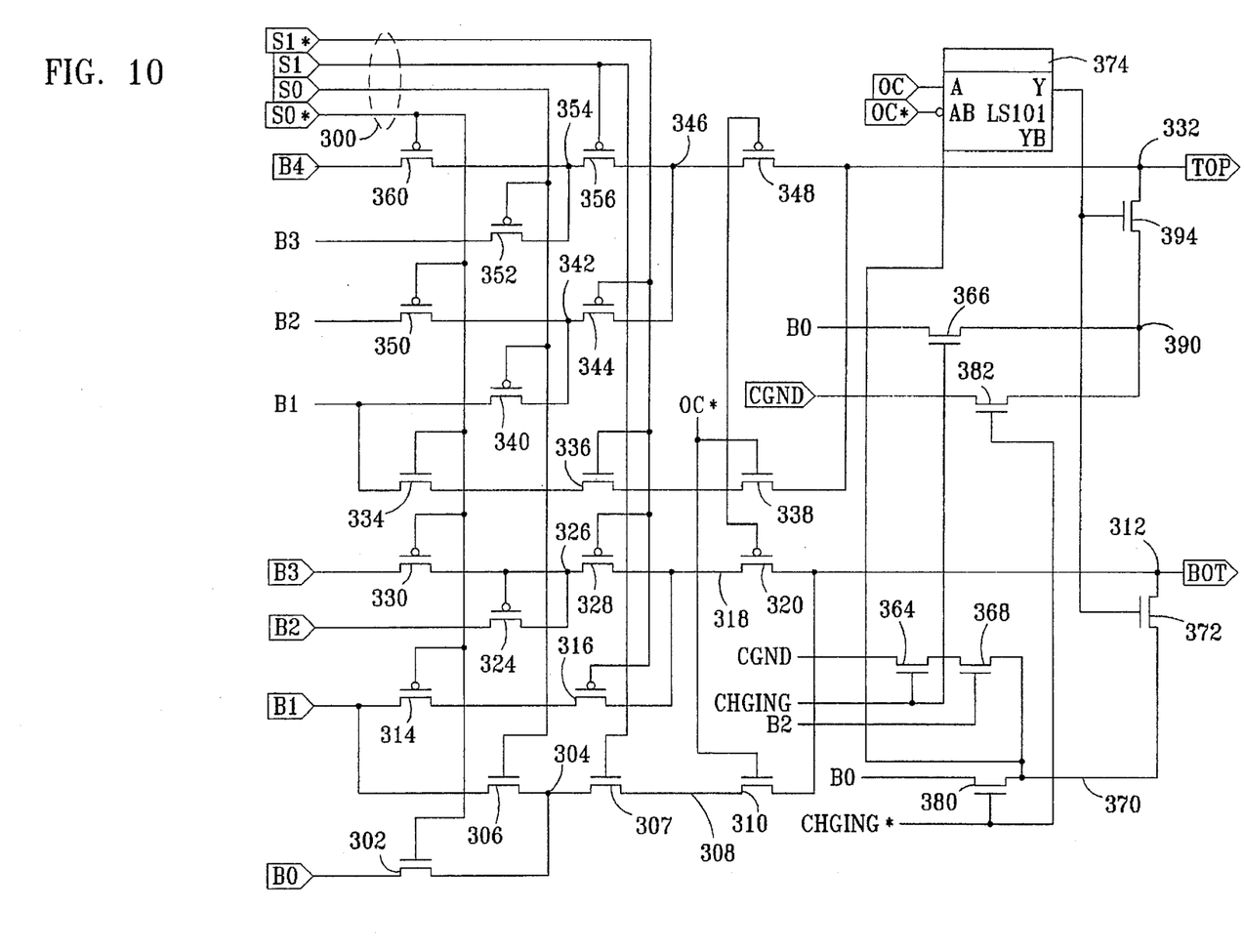
FIG. 10 illustrates a schematic diagram of the multiplexer.

Referring now to FIG. 10, there is illustrated a schematic diagram of the multiplexer. The multiplexer, as described above, commonly receives multiplex signals S1*, S1, S0 and S0* on lines 300. The battery signals on the terminals B0-B4 provide the voltage on either side of the four battery cells. The battery terminals B0-B3 are associated with the bottom terminals of the batteries and the battery terminals B1-B4 are associated with the top battery terminals. With respect to the bottom battery terminals associated with the battery terminals B0-B3, B0 is input through an N-channel transistor 302 to a node 304, the gate of transistor 302 controlled by the S0* signal. Battery terminal B1 is connected through an N-channel transistor 306 to node 304, node 304 connected through an N-channel transistor to a node 308, this connected through an N-channel transistor 310 to the BOT output on a node 312. The gate of transistor 307 is connected to the signal S1 and the gate of transistor 310 is connected to the overcurrent signal OC*. Battery terminal B1 is also connected through the gate of a P-channel transistor 314 to one side of a P-channel transistor 316, the other side of transistor 316 connected to a node 318. Node 318 is connected through a P-channel transistor 320 to the node 312. The gate of transistor 314 is connected to the SO* input, the gate of transistor 316 is connected to the S1* signal and the gate of transistor 318 is connected to the OC overcurrent signal. Terminal B2 is connected through a P-channel transistor 324 to a node 326, node 326 connected through a P-channel transistor 328 to node 318. Transistor 324 has the gate thereof connected to the SO input, and transistor 328 has the gate thereof connected to the S1 input. Battery terminal B3 is connected through a P-channel transistor 330 to node 326, the gate of transistor 330 connected to the SO* input.

The TOP output select voltage signal is provided on a node 332 labeled TOP. The battery terminal B1 associated therewith is connected through an N-channel transistor 334 to one side of an N-channel transistor 336, the other side thereof connected through an N-channel transistor 338 to node 332. The gate of transistor 334 is connected to the signal SO*, the gate of transistor 336 connected to the terminal S1 and the gate of transistor 338 connected to the OC* overcurrent signal. The B1 terminal is also connected through a P-channel transistor 340 to a node 342, node 342 connected through a P-channel transistor 344 to a node 346, node 346 connected through a P-channel transistor 348 to the node 332. Transistor 340 has the gate thereof connected to the SO input signal, transistor 344 has the gate thereof connected to the S1* signal and transistor 348 has the gate thereof connected to the OC signal. The B2 terminal is connected through a P-channel transistor 350 to the node 342, the gate of transistor 350 connected to the SO* signal. The terminal B3 is connected through a P-channel transistor 352 to a node 354, node 354 connected through a P-channel transistor 356 to the node 346. Transistor 352 has the gate thereof connected to the signal SO and transistor 356 has the gate thereof connected to the signal S1. The battery terminal B4 is connected through a P-channel transistor 360 to node 354, the gate of transistor 360 connected to the SO* signal.

The signal CHGING is connected to the gate of an N-channel transistor 364 and also to the gate of transistor 366. Transistor 364 has one side thereof connected to the common ground signal CGND and the other side thereof connected through an N-channel transistor 368 to a node 370. Transistor 368 is connected to the B2 terminal voltage. Node 370 is connected to one side of an N-channel transistor 372, the gate thereof connected to the Y-output of a two input selector circuit 374. Selector 374 is operable to select signal OC or signal OC*, these representing the overcurrent signals. The line 370 is connected through an N-channel transistor 380 to the signal B0, the gate thereof connected by the signal CHGING*. The signal CHGING* is also connected to the gate of an N-channel transistor 382. The other side of transistor 372 is connected to node 312. In operation, the presence of the CHGING signal will turn on transistor 364 and, since this is a charging operation, B2 should be sufficiently high enough to turn on transistor 368. This will result in node 370 being set to ground. In the presence of an overcurrent condition, transistor 372 will be turned on and will pull node 312 to ground. In the normal state, the transistor 380 will be turned on and the voltage on the bottom of the battery pack, B0, will be disposed on node 370. For the top terminal, the corresponding transistor to transistor 364, transistor 366, has the channel connected between the B0 terminal voltage and a node 390, node 390 connected to one side of the channel of the transistor 382, the other side thereof connected to the common ground, this transistor 382 having the gate thereof controlled by the CHGING* signal. Node 390 is connected to one side of the channel of an N-channel transistor 394, the other side thereof connected to the node 332, and the gate of transistor 394 connected to the OCA signal output by the selector 374. Therefore, whenever a charging condition is present, the voltage B0 will be placed on the node 390 such that during an overcurrent condition, this will be the voltage that the TOP terminal on node 332 is pulled down to. It should be noted that the wells of the N-channel transistors are connected to the node 370, such that they are connected either to the B0 terminal or the common ground terminal, and the wells for all the P-channel transistors are connected to the B4 terminal.

The SO, S1, S1* and SO* signals represent a binary state with the selection being illustrated in Table 1:

| SO | S1 | TOP | BOT |
|----|----|-----|-----|
| 0  | 0  | B3  | B2  |
| 0  | 1  | B4  | B3  |
| 1  | 0  | B1  | B0  |
| 1  | 1  | B2  | B1  |

Figure 11:
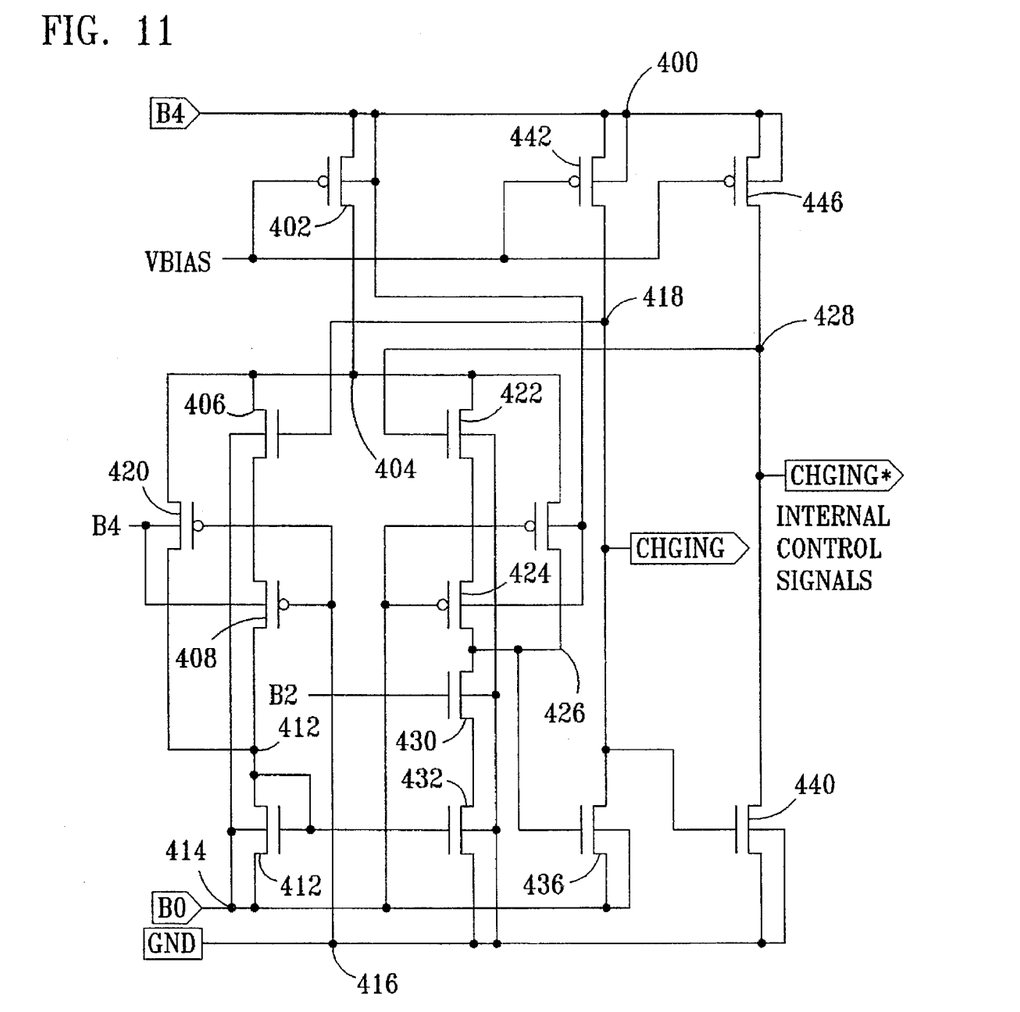
FIG. 11 illustrates a schematic diagram of the comparator for determining current direction for use with over-current detection and initiation of charging.

Referring now to FIG. 11, there is illustrated a schematic diagram of the circuitry for generating the CHGING control signal. This circuit comprises a comparator. The voltage on pin B4 is connected to a terminal 400. A P-channel transistor 402 is connected between node 400 and node 404. Node 404 is connected through an N-channel transistor 406 to one side of a P-channel transistor 408. The other side of transistor 408 is connected to a node 410, node 410 connected through an N-channel transistor 412 to the B0 terminal on a node 414. Transistor 412 is connected in a diode configuration with the drain and gate connected together, the gate of transistor 408 is connected to the common ground on a terminal 416 and the gate of transistor 406 is connected to a node 418. The gate of P-channel transistor 402 is connected to a bias signal VBIAS. The VBIAS signal is generated by a very low current bias circuitry (not shown). The node 404 is also connected through a P-channel transistor 420 to the node 410, the gate of P-channel transistor 420 connected to the ground node 416.

Node 404 is also connected through an N-channel transistor 422 to one side of a P-channel transistor 424, the other side thereof connected to a node 426. Transistor 422 has the gate thereof connected to the output on a node 428 and the gate of transistor 424 is connected to the B0 terminal on node 414. Node 428 comprises the CHGING* output. Node 426 is connected through an N-channel transistor 430 to one side of an N-channel transistor 432 to the ground terminal 416. The gate of transistor 430 is connected to the B2 terminal and the gate of transistor 432 is connected to the gate of transistor 412 to provide the mirror therefor. Node 426 is also connected to the gate of an N-channel transistor 436, the source/drain thereof connected between the B0 terminal 414 and the node 418. Node 418 comprises the CHGING output. Node 418 is connected to the gate of an N-channel transistor 440, the source/drain thereof connected between node 428 and the ground terminal 416. A P-channel transistor 442 is connected between the B4 terminal 400 and the output terminal 418, the gate thereof connected to the VBIAS signal. A P-channel transistor 446 is connected between the B4 terminal 400 and the output terminal 428, the gate thereof connected to the VBIAS signal.

It is important to note that the wells of the transistors are connected such that the wells of all the P-channel transistors, i.e., the native substrate, are connected to the B4 terminal, this being the highest supply node, but the wells of the N-channel transistors, being independent wells, are either connected to the B0 terminal 414 or the ground terminal 416. Transistors 412, 406 and 436 have the wells thereof connected to the terminal 414. Transistors 432, 430, 422 and 440 have the wells thereof connected to the ground terminal 416. In operation, it can be seen that whenever the CHGING signal on node 418 is pulled low through transistor 436, this will cause node 428 to go high, turning transistor 422 on. This will introduce more current to node 426, thus pulling node 426 higher. As the voltage difference between the B0 terminal 414 and the ground terminal 416 increases with B0 going higher than ground, transistor 436 will reach a point where it will turn off, allowing transistor 442 to pull node 418 high. When node 418 goes high, transistor 440 will turn on and node 428 will go low, turning off transistor 422 and decreasing the current to node 426. At the same time, node 418 will turn on transistor 406, increasing the current to node 410. In the opposite condition, when ground rises above the voltage on the B0 terminal 414, this will cause transistor 440 to turn off, allowing transistor 446 to pull node 428 high, again turning on transistor 422, introducing more current to node 426 to subsequently turn on transistor 436. Therefore, the CHGING signal indicates when the terminal B0 rises above the GND terminal by a predetermined level and also when the B0 signal falls below the GND signal. This can be used for the onset of charging and also for an overcurrent condition indicating current flowing from ground to the B0 terminal. This shows a current direction.

In summary, there has been provided a battery charger/ protection device for use with multiple lithium ion cells. The battery charger is operable to determine the state of each of the cells in a sequential manner with each cell having the voltage thereacross sensed and the profile of the battery during charging examined. The battery charger will determine if a given cell is in an overcharge condition or in an undercharge condition. Additionally, the entire grouping of battery cells will be examined to determine if there is an overcurrent condition. To accommodate different types of cells, a single five pin device is provided for accessing four cells. When only three cells are provided, two of the terminals are connected together to a positive terminal. By determining that there is no cell in a given location, it is only necessary not to examine the cell for purposes of monitoring he operation of the battery undercharge.

Although the preferred embodiment has been described in detail, it should be understood that various changes, substitutions and alterations can be made therein without departing from the spirit and scope of the invention as defined by the appended claims.

What is claimed is:

1. A battery charger/monitor for charging/monitoring a plurality of series-connected battery cells in a battery pack which can be charged from an external charging supply, comprising:

a package having a finite set of input/output pins, said input/output pins including a plurality of input sense pins arranged in pairs, each pair able to be connected across a battery cell in a battery pack, wherein each of the cells in the battery pack is associated with a separate one of said pairs of sense pins;

a voltage monitor for monitoring the voltage across each of said pairs of sense pins;

a test circuit for performing a plurality of tests on each pair of said sense pins utilizing said associated monitored voltage provided by said voltage monitor, each of said tests determining characteristics of the battery pack by monitoring the voltage on said sense pins and applying a predetermined test algorithm thereto that compares the determined characteristics with predetermined acceptable limits to determine if said monitored characteristics are outside of said acceptable limits;

a no cell circuit for determining if any of said pairs of sense pins has no cell connected thereacross as determined by said monitored voltage output by said monitoring circuit;

a control system for controlling the charging and discharging operation of the battery in accordance with the results determined by said test circuit; and an inhibiting circuit for inhibiting the results of said test circuit from being utilized by said control system that result from the ones of said sense pins determined by said no cell circuit not to have a cell associated therewith.

2. The battery charger/monitor of claim 1, wherein said pairs of sense pins are adjacent to each other and each adjacent pair of sense pins sharing a common sense pin.

3. The battery charger/monitor of claim 2, wherein, if the number of pairs of said sense pins number greater than the number of cells in the battery pack, then a conductive short will be disposed across the pins not having a cell associated therewith.

4. The battery charger/monitor of claim 3, wherein said voltage monitor compares the voltage on each pair of said sense pins with a predetermined voltage threshold and, if said monitored voltage falls below said predetermined voltage, an indication that a short is disposed across said sense pins is indicated, this indicating that no cells are connected thereacross.

5. The battery charger/monitor of claim 1, wherein said test circuit comprises:

a comparator having a monitored voltage input, a reference voltage input and an output, which output indicates whether the monitored voltage input is above or below the reference voltage input;

a multiplexer having multiple inputs and a single output, said single output connected to the monitored voltage input of said comparator and said multiple inputs connected across each of said pairs of sense pins, said multiplexer operable to selectively measure the voltage across each of said pairs of sense pins and provide it on the output thereof;

a programmable attenuator for providing multiple reference voltages, each reference voltage associated with one of said plurality of tests;

a test control system for controlling said multiplexer and said programmable attenuator to perform said plurality of tests in a first predetermined order of tests on said pairs of sense pins in a second predetermined order of pins, such that each pair of sense pins is first selected and then each of said plurality of tests is performed by said test circuit on said selected pair of sense pins; and said output of said comparator provided as an input to said control system.

6. The battery charger/monitor of claim 5, wherein said programmable attenuator further includes a low reference voltage for use with said no cell circuit and said no cell circuit comprises said programmable attenuator utilizing said low reference voltage, which is operable to utilize said low reference voltage upon selecting of each of said pairs of sense pins by said multiplexer prior to performing any of said tests.

7. The battery charger/monitor for claim 1, wherein said control system comprises a switching device for being connected between one side of the battery pack opposite to the side connected to the positive terminal of the charging supply and the other side thereof connected to the negative side of the charging supply, said switching device controlled by said control system to interrupt charging in a predetermined manner.

8. The battery charger/monitor of claim 7, wherein at least one of said tests comprises the comparison of the monitored voltage across each of the said pairs of sense pins with an upper voltage threshold and, if it exceeds the upper voltage threshold, declaring an overvoltage condition and opening said switching device such that current does not pass through the battery pack, and another of said tests comparing the monitored voltage on each of said pairs of sense pins to a mid-level threshold voltage and declaring a charge enable condition when the monitored voltage on a given set of said pairs of sense pins falls below said mid-level threshold voltage, said control system operable to terminate charge upon declaration of an overvoltage condition by opening said switching device and enable charge upon the declaration of said charge enable condition by closing said switch.

9. The battery charger/monitor of claim 8, wherein said control system opens said switching device upon the declaration of an overvoltage condition on any of said pairs of sense pins and initiates charging upon determining that the monitored voltage on all of said pairs of sense pins is above said mid-level threshold voltage, with the exception of the ones of said sense pins determined not to have a cell disposed thereacross by said no cell circuit.

10. The battery charger/monitor of claim 7, wherein one of said plurality of tests comprises comparing the monitored voltage with a low level threshold voltage and declaring an undervoltage condition for the associated one of said pairs of said sense pins when the monitored voltage falls below said low level threshold voltage and said control system opening said switching device when any of said sense pins is determined to have the monitored voltage fall below said low level threshold voltage.

11. The battery charger/monitor of claim 7, wherein said voltage monitor is further operable to monitor the voltage across said switching device and wherein said switching device has a finite impedance associated therewith and said test circuit is operable to perform a test on the monitored voltage across said switching device by comparing the monitored voltage across said switching device with an overcurrent threshold voltage and, if said monitored voltage across said switching device exceeds said overcurrent threshold voltage, an overcurrent condition is declared and said control system is operable to open said switching device when an overcurrent condition is declared.

12. The battery charger/monitor of claim 11, wherein said voltage monitor is operable to monitor the voltage across said switching device when said switching device is open and, when said voltage rises above a predetermined charge determination threshold voltage, declaring that a charging operation has been initiated and wherein said control system is operable to close said switching device upon the determination of a charge initiation declaration wherein an indication is provided that a charge supply has been connected between the positive terminal of the battery pack and the negative terminal thereof.

13. A battery charger/monitor integrated circuit for monitoring and controlling the charging operation of a plurality of series connected battery cells in a battery pack having positive and negative terminals, comprising:

an integrated circuit package for containing the battery charger/monitor integrated circuit;

n voltage sense pins integral to said integrated circuit package and adaptable to be connected successively to the terminals of battery cells in a battery pack with the n=1 sense pin connected to the negative terminal of the battery pack and the n sense pin connected to the positive terminal of the battery pack such that adjacent sense pins can be disposed across a given battery cell, wherein a maximum of n−1 battery cells can be accommodated;

a voltage monitor circuit for monitoring the voltage across adjacent sense pins;

control pins for outputting charge control signals to an external charge control device;

a charge control system for controlling the charging operation of the battery pack from an external charging supply in accordance with a charge control scheme that is a function of the monitored voltage of single pairs of said sense pins by generating control signals for output on control pins from the integrated circuit package; and a blocking circuit for determining if a short is disposed in place of an available cell position whenever less than n−1 cells are present in the battery pack, indicating that no cell is disposed at that cell location, and modifying said function such that the voltage measured across said determined no cell location is not utilized in said function.

14. The battery charger/monitor integrated circuit of claim 13, wherein said voltage monitor circuit comprises:

a voltage measurement device; and a multiplexer for selectively connecting said voltage measurement device to select ones of said pairs of sense pins, said multiplexer controlled by said control system.

15. The battery charger/monitor integrated circuit of claim 14, wherein said control system operates said multiplexer to sequentially connect said pairs of sense pins in a continuous and sequential manner in a predetermined order.

16. The battery charger/monitor circuit of claim 15, wherein said control system is operable to perform a plurality of monitoring tests on each of said pairs of sense pins when the voltage thereof is measured, said tests performed in a sequential manner.

17. The battery charger/monitor of claim 16, wherein said voltage measurement device comprises:

a comparator;

a programmable voltage reference device for providing a plurality of test voltage thresholds; and said comparator comparing said selected voltage by said multiplexer to said threshold for each of said tests.

18. The battery charger/monitor integrated circuit of claim 14, wherein said voltage measurement device comprises:

a comparator;

a programmable voltage reference device for providing a plurality of test voltage thresholds; and said comparator comparing said selected voltage by said multiplexer to said threshold for each of said tests.

19. A method for charging/monitoring a plurality of series-connected battery cells in a battery pack which can be charged from an external charging supply, comprising the steps of:

providing a package having a finite set of input/output pins, the input/output pins including a plurality of input sense pins arranged in pairs, each pair able to be connected across the battery cell in a battery pack, wherein each of the cells in the battery pack is associated with a separate one of the pairs of sense pins;

monitoring the voltage across each of the pairs of sense pins;

performing a plurality of tests on each pair of sense pins utilizing the associated monitored voltage provided by the step of monitoring, each of the tests operable to determine the characteristics of the battery pack by monitoring the voltage on the sense pins and applying a predetermined test algorithm thereto that compares the determined characteristics with predetermined acceptable limits to determine if the monitored characteristics are outside of the acceptable limits;

determining if any of the pairs of sense pins has no cell connected thereacross as determined by the monitored voltage output by the step of monitoring;

controlling the charging and discharging operation of the battery in accordance with the results determined by the test circuit; and inhibiting the results of the testing steps associated with a given pair of sense terminals determined to have no cell associated therewith from being utilized by the controlling step.

20. The method of claim 19, wherein the pairs of sense pins are adjacent to each other and each adjacent pair of sense pins sharing a common sense pin.

21. The method of claim 20, wherein, if the number of pairs of the sense pins number greater than the number of the cells in the battery pack, then disposing a conductive short across the pins not having a cell associated therewith.

22. The method of claim 21, wherein the step of monitoring the voltage comprises the step of comparing the voltage on each pair of the sense pins with a predetermined voltage threshold and, if the monitored voltage falls below the predetermined voltage, an indication that a short is disposed across the sense pins is indicated, this indicating that no cells are connected thereacross.

23. The method of claim 19, wherein the step of performing the plurality of tests comprises:

comparing the monitored voltage with a reference voltage input and providing an output that is a function of whether the monitored voltage input is above or below the reference voltage input;

providing a multiplexer having multiple inputs and a single output and providing the single output to the monitored voltage input utilized in the step of comparing and connecting the multiple inputs across each of the pairs of sense pins, the multiplexer operable to select each of the pairs of sense pins and connect them to the output thereof, providing multiple reference voltages and selecting with a programmable attenuator one of the multiple reference voltages for use with an associated one of the plurality of tests;

controlling the multiplexer and the programmable attenuator to perform the plurality of tests in a first predetermined order of tests on the pairs of sense pins in a second predetermined order of pins, such that each pair of sense pins is first selected by the multiplexer and then each of the plurality of tests is performed by the step of testing on the selected pair of sense pins; and providing the output of the step of comparison as an input to the step of controlling.

* * * * *

UNITED STATES PATENT AND TRADEMARK OFFICE
CERTIFICATE OF CORRECTION

PATENT NO. : 5,631,537
DATED : May 20, 1997
INVENTOR(S) : Gene Armstrong

It is certified that error appears in the above-indentified patent and that said Letters Patent is hereby corrected as shown below:

Column 5, line 15, delete "mined", and insert therefor --turned--;

Column 18, line 18, Claim 23, delete "," and insert therefor --;--.

Signed and Sealed this

Thirtieth Day of November, 1999

Attest:

Attesting Officer

Q. TODD DICKINSON

Acting Commissioner of Patents and Trademarks